United States Patent Office 2,795,613
Patented June 11, 1957

2,795,613

BASIC DERIVATIVE OF 2-METHYL-4-CYCLO-HEXYL-PHENOL AND PROCESS FOR THE MANUFACTURE THEREOF

Max Walter, Basel, Switzerland, assignor to Hoffmann-La Roche Inc., Nutley, N. J., a corporation of New Jersey No Drawing. Application April 28, 1954,
Serial No. 426,310

Claims priority, application Switzerland May 12, 1953

6 Claims. (Cl. 260—570.9)

The present invention is concerned with novel basic derivatives of 2-methyl-4-cyclohexyl-phenol, more particularly with 2 - methyl - 4-cyclohexyl-6-methylaminomethyl-phenol and the acid addition salts thereof, and with a process for the manufacture of the said compounds.

The most preferred salt of 2-methyl-4-cyclohexyl-6-methyl-aminomethyl-phenol is the hydrochloride which melts at 200–201° C. It is colorless, dissolves easily in water and in alcohol, the reaction of the solution thus obtained being slightly acid. It has no odor and a bitter taste. It exhibits a powerful action against fungi and may be used as a therapeutic agent against fungus infections of the body, e. g. in form of ointments or in powder form, the powder being preferably made up of the compound in a mixture with other powders, such as talcum or diatomaceous earth.

The process provided by the invention for preparing the above compounds comprises reacting 2-methyl-4-cyclohexyl-phenol with formaldehyde or a formaldehyde polymerisate, and with benzylmethylamine or a salt of the latter.

The highest dilutions of 2-methyl-4-cyclohexyl-6-methylaminomethyl-phenol hydrochloride at which the growth of broth cultures of fungi, which are pathogenic to the skin is still inhibited, are the following:

*Trychophyton mentagrophytes* _____ 1:100,000
*Achorion quinckeanum* _____ 1:100,000
*Achorion schoenleinii* _____ 1:100,000

In contradistinction thereto, undecylenic acid, which is a well-known preparation for the treatment of dermatomycosis, exerts an action upon strains of tricho-phyton only up to a dilution of 1:1000 (Kimmig & Jerchel, Klinische Wochenschrift 1950, page 429).

When treating guinea-pigs infected with trychophyton mentagrophytes by means of a 10 percent ointment of 2-methyl-4-cyclohexyl-6-methylaminomethyl - phenol hydrochloride, the duration of the fungus infection of the fell is reduced to one-half, whereas by treatment with a 10 percent undecylenic acid ointment, the infection is of as long a duration as that of a control group of untreated animals.

*Example*

193 parts by weight of 2-methyl-4-cyclohexyl-phenol (melting point 120–123° C.; boiling point 165–166° C./12 mm.), which may easily be obtained by reaction of dialkylamines with formaldehyde and 4-cyclohexyl-phenol and subsequent hydrogenation, are dissolved in 500 parts by volume of absolute alcohol and added to 121 parts by weight of methylbenzylamine. In the course of 2 hours, 30 parts by weight of paraformaldehyde in 10 portions are added, while stirring and refluxing. The mixture is allowed to boil for additional 8 hours, then the alcohol is distilled off in vacuo and the residue is dissolved in ether. For the purpose of further purification the ether solution is exhaustively extracted with a total amount of 400 parts by volume of 3 N hydrochloric acid. The clear aqueous solution is made alkaline to phenolphthalein with ammonia and is extracted exhaustively with a total amount of 400 parts by volume of ether. The ether solution is washed with 50 parts of water, dried over sodium sulfate and the ether is distilled off. 200–250 parts by weight of 2-methyl - 4 - cyclohexyl-6-(methylbenzyl-aminomethyl)-phenol are obtained as a yellow oil. 200 parts by weight of 2 - methyl-4-cyclohexyl-6-(methyl-benzyl-aminomethyl)-phenol are hydrogenated in 2000 parts by volume of methanol in the presence of 20 parts by weight of palladium charcoal (1 part by weight of palladium) and 190 parts by volume of 3 N hydrochloric acid. As soon as the calculated amount of hydrogen has been taken up, the solution is sucked off from palladium the charcoal and the filtrate is evaporated to dryness in vacuo. The residue is recrystallized from alcohol. The pure 2-methyl-4-cyclohexyl-6-methylaminomethyl-phenol hydrochloride melts at 200–201° C. The novel compound forms colorless crystals. It dissolves easily in water and alcohols, the solution being slightly acid.

I claim:

1. A member of the group consisting of 2-methyl-4-cyclohexyl - 6 - (methylbenzyl-aminomethyl)-phenol, 2-methyl-4-cyclohexyl - 6 - methylaminomethyl-phenol and acid addition salts thereof.

2. 2-methyl-4-cyclohexyl-6-methylaminomethyl-phenol hydrochloride.

3. 2-methyl-4-cyclohexyl-6-methylaminomethyl-phenol.

4. 2-methyl - 4 - cyclohexyl - 6 - (methylbenzyl-aminomethyl)-phenol.

5. A process for the production of a member of the group consisting of 2-methyl-4-cyclohexyl-6-methyl-aminomethyl-phenol and acid addition salts thereof which comprises reacting 2-methyl-4-cyclohexyl-phenol with a member of the group consisting of formaldehyde and formaldehyde polymers and a member of the group consisting of methylbenzylamine and methylbenzylamine salts under reflux conditions, solvent extracting the 2-methyl - 4 - cyclohexyl-6-(methylbenzyl-aminomethyl)-phenol compound so produced, and catalytically hydrogenating the said 2-methyl-4-cyclohexyl-6-(methylbenzyl-aminomethyl)-phenol compound.

6. A process for the production of 2-methyl-4-cyclohexyl-6-methylaminomethyl-phenol which comprises hydrogenating 2-methyl - 4 - cyclohexyl-6-(methylbenzyl-aminomethyl)-phenol in the presence of a palladium catalyst.

References Cited in the file of this patent

UNITED STATES PATENTS

| | | |
|---|---|---|
| 2,275,311 | Pedersen et al. | Mar. 3, 1942 |
| 2,363,134 | McCleary | Nov. 21, 1944 |
| 2,417,118 | McCleary et al. | Mar. 11, 1947 |
| 2,636,019 | Butler et al. | Apr. 21, 1953 |
| 2,725,357 | Klunge et al. | Nov. 29, 1955 |

OTHER REFERENCES

Wagner et al.: Synthetic Organic Chemistry, N. Y., John Wiley and Sons, Inc. (1953), pp. 665, section 434.